United States Patent [19]

Chadwick

[11] Patent Number: 5,581,132
[45] Date of Patent: Dec. 3, 1996

[54] PEAK DEMAND LIMITER AND SEQUENCER

[76] Inventor: Jon D. Chadwick, 6455 McKown Rd., Sarasota, Fla. 34240

[21] Appl. No.: 511,708

[22] Filed: Aug. 4, 1995

[51] Int. Cl.⁶ .................................................. H02J 3/14
[52] U.S. Cl. .................... 307/38; 307/11; 307/39; 307/141; 361/62; 361/63; 361/94; 340/664; 315/209 R
[58] Field of Search ................... 307/11, 38, 39, 307/141; 361/94, 62, 63; 340/664; 364/492; 315/209 R

[56] References Cited

U.S. PATENT DOCUMENTS

| | | | |
|---|---|---|---|
| 4,090,088 | 5/1978 | McMahon | 307/38 |
| 4,161,028 | 7/1979 | Davis et al. | 364/492 |
| 4,168,491 | 9/1979 | Phillips et al. | 340/310 |
| 4,213,058 | 7/1980 | Townsend | 307/40 |
| 4,216,384 | 8/1980 | Hurley | 307/39 |
| 4,283,635 | 8/1981 | Balmer | 307/35 |
| 4,336,462 | 6/1982 | Hedges et al. | 307/35 |
| 4,370,723 | 1/1983 | Huffman | 364/483 |
| 4,446,359 | 5/1984 | Arribas et al. | 219/485 |
| 4,464,724 | 8/1984 | Gurr et al. | 364/492 |
| 4,471,232 | 9/1984 | Peddie et al. | 307/35 |
| 4,510,398 | 4/1985 | Culp et al. | 307/35 |
| 4,659,943 | 4/1987 | Virant | 307/39 |
| 4,694,192 | 9/1987 | Payne et al. | 307/39 |
| 4,695,738 | 9/1987 | Wilmot | 307/31 |
| 4,771,185 | 9/1988 | Feron et al. | 307/39 |
| 4,808,841 | 2/1989 | Ito et al. | 307/11 |
| 4,847,781 | 7/1989 | Brown, III | 364/492 |
| 5,181,180 | 1/1993 | Munro | 364/492 |
| 5,237,207 | 8/1993 | Kwiatkowski | 307/31 |
| 5,243,225 | 9/1993 | Schweer et al. | 307/38 |
| 5,278,771 | 1/1994 | Nyenya | 364/492 |
| 5,281,859 | 1/1994 | Crane | 307/139 |
| 5,315,293 | 5/1994 | Kamiya | 340/664 |

*Primary Examiner*—William M. Shoop, Jr.
*Assistant Examiner*—Albert W. Paladini
*Attorney, Agent, or Firm*—Charles J. Prescott

[57] ABSTRACT

An electrical control system for sensing instantaneous total electrical power consumption being delivered into a facility and for interrupting selected electrical current consuming loads within the facility when the total incoming current consumption exceeds one or more preselected maximum level for a continuous first preselected time period. The system utilizes existing power transmission lines within the facility to sequentially transmit at least two pulsed digital shut down signals on each of at least two phases or legs of transmission lines within the facility to one or more remote shut down units at the end of the continuous time period. Each remote unit then interrupts electrical power to at least one electrical load within the building for a second preselected time period, after which power is restored to the electrical load until the total current consumption again exceeds one of the preselected maximum load levels continuously for the first time period. Where there are numerous electrical loads to be interrupted, each remote unit then sequentially reestablishes electrical power to each electrical load so as to avoid excessive current surge into the facility. The system also includes a fail safe circuit for resetting all remote units in the event of a power outage.

7 Claims, 5 Drawing Sheets

PEAK DEMAND LIMITER AND SEQUENCER

BACKGROUND OF THE INVENTION

1. Scope of Invention

This invention relates generally to electrical energy management systems, and more particularly to a system for interrupting the electrical power being supplied to selected electrical loads within a facility when the incoming current load exceeds a predetermined maximum level for a continuous preselected time period.

2. Prior Art

As the unit cost of electrical power being supplied into a facility increases, the incentive to control that expenditure increases as well. All facilities utilizing electric power, particularly commercial facilities, churches, schools and the like, incur peaks in the overall current consumption during time periods of minimum electrical load operation within the facility.

For example, churches and schools would have more obvious time periods of peak electrical load with respect to both lighting and air conditioning equipment when the facility is in use. Likewise, commercial restaurants encounter extreme peak electrical power usage during normal meal hours. It is during these peak load time periods that the bulk of the electrical power is consumed and thus has the greatest impact upon the overall monthly cost of electrical power.

The broad concept of limiting the maximum current consumption to a particular upper current level by various means in order to reduce electrical power consumption costs appears to be well known. The following U.S. Patents and the corresponding inventors which have addressed this challenge are set forth herebelow:

| U.S. Pat. No. | Inventor |
| --- | --- |
| 4,090,088 | McMahon, et al. |
| 4,168,491 | Phillips, et al. |
| 4,213,058 | Townsend |
| 4,216,384 | Hurley |
| 4,336,462 | Hedges, et al. |
| 4,370,723 | Huffman, et al. |
| 4,446,359 | Arribas, et al. |
| 4,464,724 | Gurr, et al. |
| 4,471,232 | Peddie, et al. |
| 4,510,398 | Culp, et. al. |
| 4,659,943 | Virant |
| 4,694,192 | Payne, et al. |
| 4,695,738 | Wilmot |
| 4,771,185 | Feron, et al. |
| 4,808,841 | Ito, et al. |
| 4,847,781 | Brown, III, et al. |
| 5,237,207 | Kwiatkowski, et al. |
| 5,243,225 | Schweer, et al. |
| 5,278,771 | Nyenya |
| 5,281,859 | Crane |

More specifically, the Phillips' U.S. Pat. No. 4,168,491 discloses an energy demand controller and method of operation thereof, including a sensor for measuring instantaneous power being delivered to a building and a controller which allows the user to preselect a power limit for use in the building. A comparator serves to compare the input power to the preselected value and to switch off the power to various heating zones within the building in order to maintain the input power at a preselected power level. Preprioritizing determines the sequence of load interruption.

The Peddie U.S. Pat. No. 4,471,232 teaches controlling individual loads within an electrical system, a signal being transmitted over the power lines to individual loads to establish the priority sequence based upon individual load consumption.

Schweer in the U.S. Pat. No. 5,243,225 also teaches a load shedding system during peak load demand periods by transmitting a pulsed signal over each phase of a power transmission line by utilizing a phase injective transmitter and a communication link in a remote transmitter interacting upon a group of receivers.

The Brown U.S. Pat. No. 4,847,781 discloses an energy management system utilizing pulse control signals sent over the home wiring lines to control equipment utilizing on/off commands initially sent from a central control station located outside of the home.

McMahon in the U.S. Pat. No. 4,090,088 teaches the use of a control unit to continuously monitor the total power level of the facility and the sending of signals to the load control units based upon changes in this power demand level. Loads are shut off on a prioritized cycling basis, cycling being achieved on a timed basis.

In the U.S. Pat. No. 4,808,841 to Ito, peak power load control to an electric heating system is there provided. Upon detection of a preselected peak load, power is cut off to one or more heating units in succession and then reconnected. Power cut-off time is extended on a predetermined adjustable basis.

None of these references appear to disclose all of the features of the present invention in combination. More specifically, the features of utilizing a sensing unit for power input into a facility and for providing an initial interrupt signal only after the peak load exceeds a one or more preselected peak values for a predetermined continuous time period, utilizing two of the three phases of a multi-phase power transmission line for signal redundancy and reliability and the sequenced reactivating of loads on a predetermined incrementally stepped basis by the remotely located limiters are some of the features of the present invention not disclosed in these prior art references.

BRIEF SUMMARY OF THE INVENTION

This invention is directed to an electrical control system for sensing instantaneous total electrical power consumption being allowed into a facility and for interrupting selected electrical current consuming loads within the facility when the total incoming current consumption exceeds a preselected maximum level for a continuous first preselected time period. The system utilizes existing power transmission lines within the facility to transmit individual redundant pulsed digital shut down signals to one or more remote shut down units at the end of the continuous time period. Each remote unit then interrupts electrical power to at least one electrical load within the building for a second preselected time period, after which power is restored to the electrical load until the total current consumption again exceeds the preselected maximum level continuously for the first time period. Where there are numerous electrical loads to be interrupted, each remote unit then sequentially reestablishes electrical power to each electrical load so as to avoid excessive current surge into the facility. A fail safe circuit for resetting the system in the event of a power outage is also provided.

It is therefore an object of this invention to provide a peak demand limiter and sequencer for installation and use in conjunction with electrical power supply of a facility utilizing one or more electrical loads therewithin.

It is yet another object of this invention to provide a load shedding system responsive to preselected peak current levels entering a facility for use by the selective interruption of electrical power to selected electrical loads for predetermined time periods and the preselected sequencing of power restoration.

It is yet another object of this invention to provide a system for sensing incoming electrical current being supplied to a facility and for the interruption of electrical power being supplied to selected electrical loads after the incoming current has exceeded a preselected peak level for a predetermined time period.

It is yet another object to accomplish the above objects utilizing the existing electrical wiring within the facility which otherwise supplies current to the circuit breaker panel of the facility.

In accordance with these and other objects which will become apparent hereinafter, the instant invention will now be described with reference to the accompanying drawings.

DETAILED DESCRIPTION OF THE INVENTION

Figure 1:
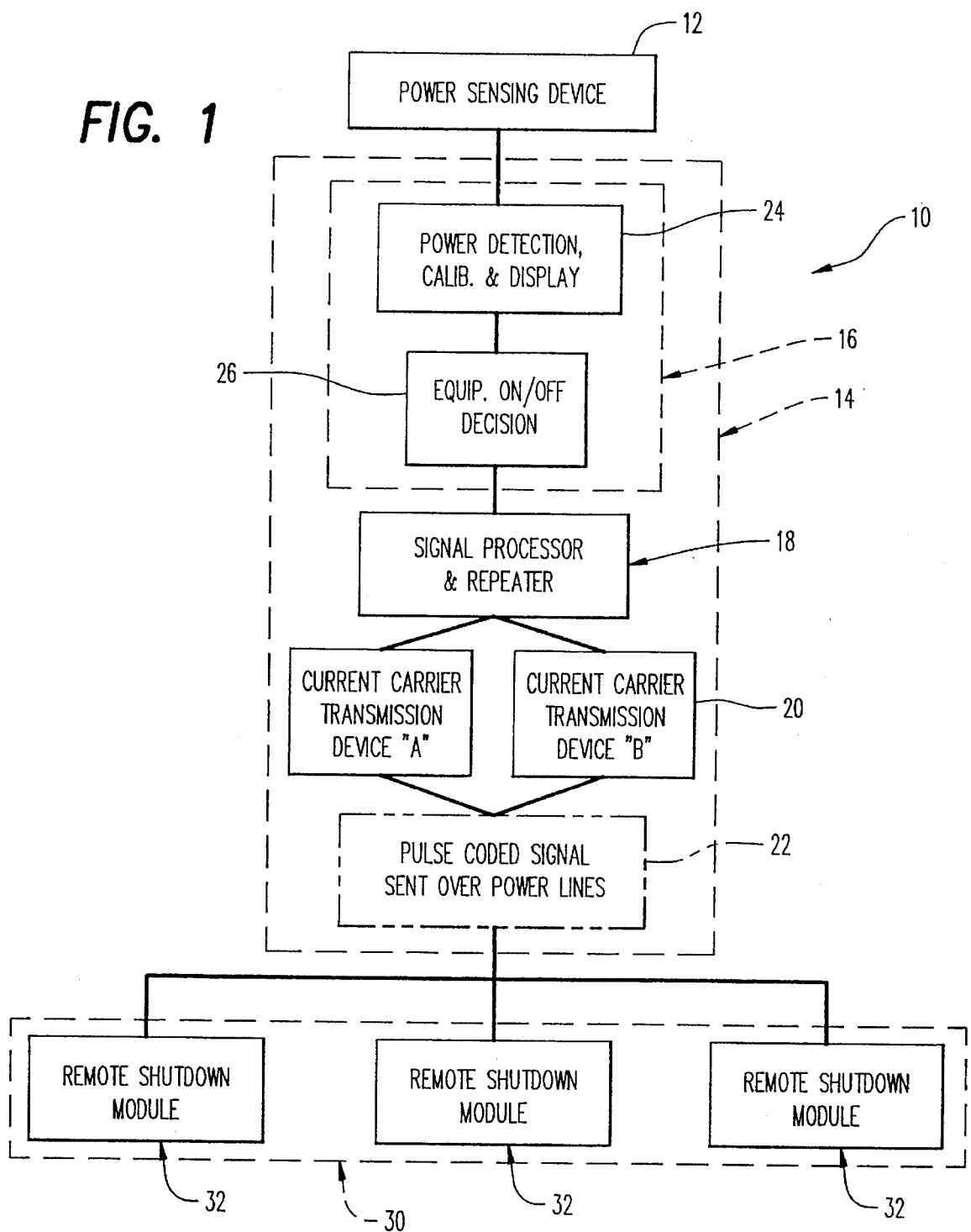
FIG. 1 is a schematic block diagram of the invention.

Referring now to the drawings, and particularly to FIG. 1, the system is shown generally at numeral 10 and includes a power sensing device 12 of a conventional nature such as an induction coil which senses and provides a useful electrical signal proportional to incoming electrical current into a facility. When properly calibrated, this sensing device 12 will then provide a signal accurately proportional to the incoming current load.

Figure 2:
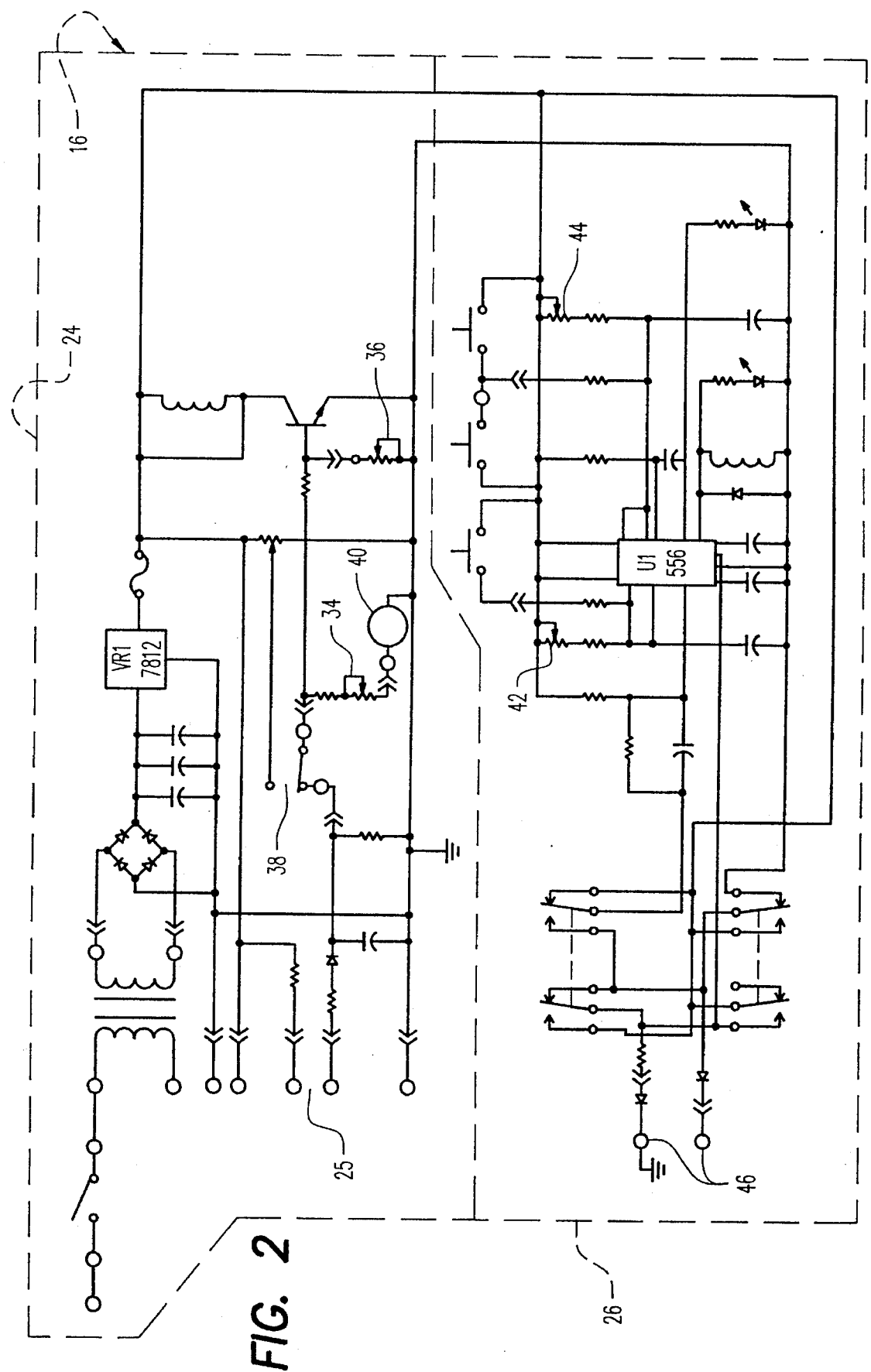
FIG. 2 is a detailed schematic diagram of the power detection and shut-down circuitry (16) of the system (10) of FIG. 1.

At the main point of installation within any facility, the system 10 includes a power detection and shutdown circuit shown generally at 16 including a power detection, calibration and display circuit 24 and an equipment on/off or shut down decision circuit 26, the combination 16 generally shown in more detail in FIG. 2. Within this circuit 16, the input signal at 25 received from the sensing device 12 is converted to a relative power reading by means of an internal calibration circuit described herebelow. After calibration of the system, a peak current input load is selected as will also be described herebelow.

The system 10 then continually monitors power input and, as soon as the preselected peak input load is exceeded, a timer is activated and begins to countdown a predetermined first time period. If the incoming power load continuously exceeds the preselected peak load level during this entire first time period, a load shed control signal is produced within circuit 26 commencing the shutdown process of selected equipment within the facility.

Figure 3:
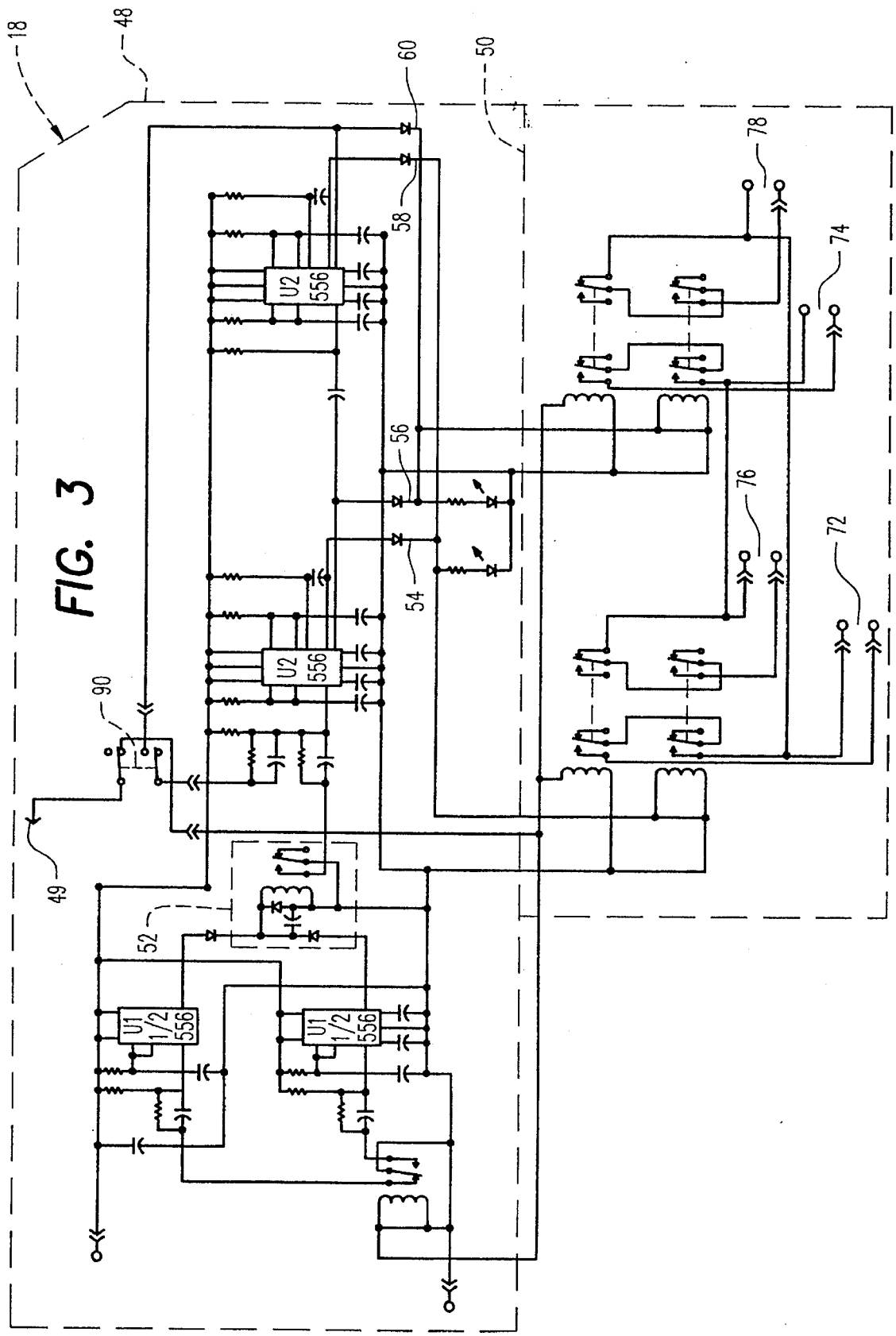
FIG. 3 is a detailed schematic diagram of the signal processor and repeater of the system (10) of FIG. 1.

The load shed control signal is received from output 46 into a signal processor and repeater 18 as shown in greater detail in FIG. 3. The signal processor/repeater 18 includes circuit portion 48 which receives the shutdown command from circuit portion 26 at 49 and then produces sequenced command signals at 54, 56, 58 and 60, which are then received into circuit portion 50. By this arrangement, a signal first emanates from 54 which results in a first shutdown digital pulse of short duration from current carrier transmission device "A" to be sent over one phase of the power line 20 in FIG. 1 of the facility to the circuit breaker panel (not shown) from 72. Immediately following, a second pulsed digital code is produced at 56 resulting in a second shutdown signal being emitted from current carrier transmission device "B" at 74 through another phase of the power transmission line 20 to the circuit breaker panel. A third digital pulsed signal is generated at 58 and is sent by the first phase of the power transmission line 20 from 72 and a fourth pulsed signal emits through the second phase of the power transmission line from 74. When a turn on command is received from output 46 into a signal processor/repeater 18, a turn on signal is emitted at 76 and 78 in the same sequential manner as described for the shut down signal.

By this arrangement of four separate pulsed signals from two individual transmission devices being sequentially sent through two phases of the power transmission line 20 to the circuit breaker panel, a quad-redundancy is established so that virtually no noise or interference within the facility is likely to result in system interference and failure. By using two current carrier transmission devices as opposed to the accepted norm of using one with signal bridging to the other phases, a stronger signal results. Also redundance protects against failure of one of the devices causing the entire system to fail. The system will work with only one transmission device. These controllers 20 are a commercially available item manufactured by the X-10 Corp. Connection is at its on-off terminals and to #4 and #8 common termination.

Figure 4:
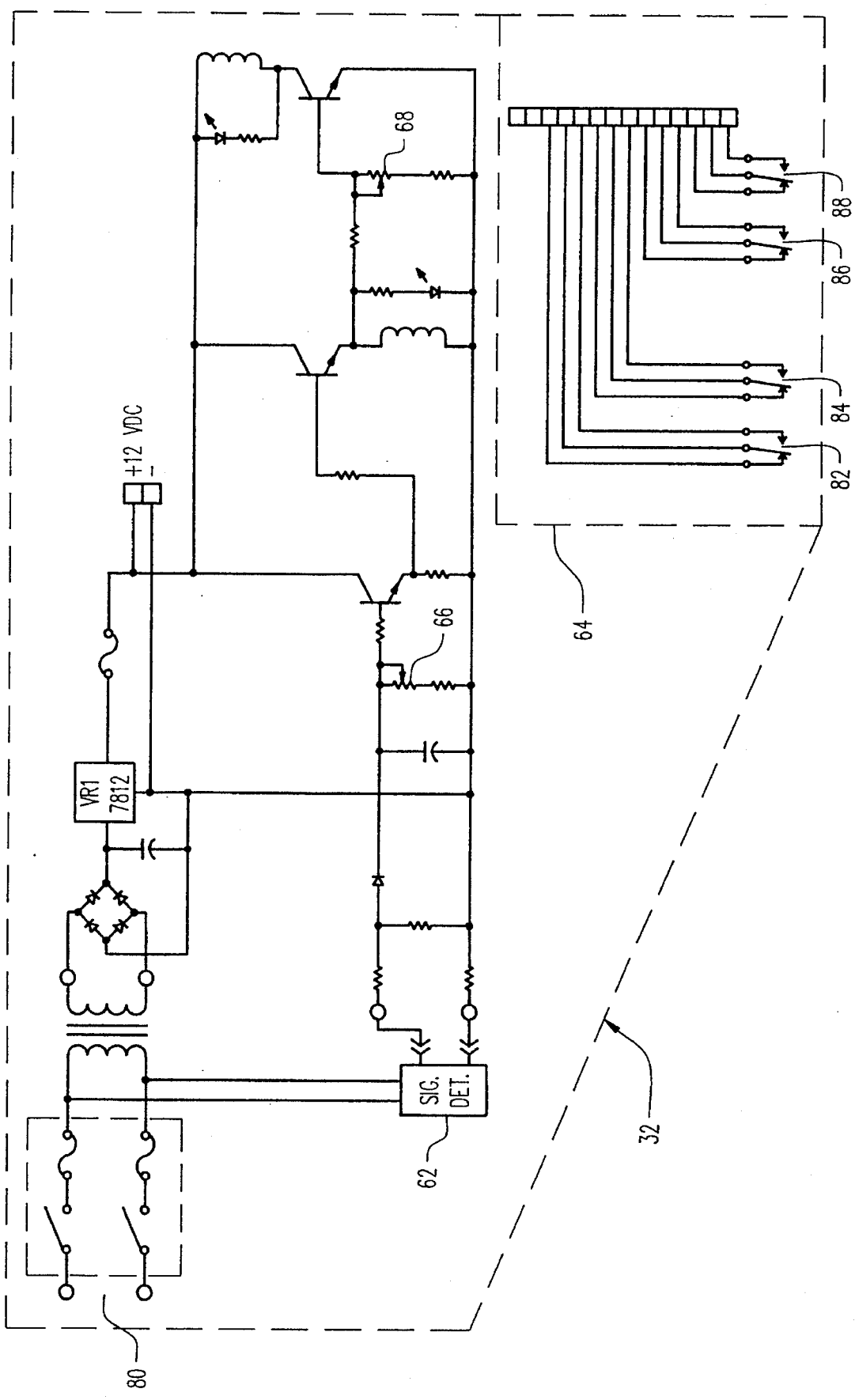
FIG. 4 is a detail schematic diagram of one remote shut-down module of the system (10) of FIG. 1.

Referring now to FIGS. 1 and 4, the details of each remote shut-down module 32 are there shown. The pulsed shut down signals being received at 80 from the power transmission lines 22 extending from the circuit breaker panel to each electrical load within the facility such as an air conditioner, resistance heating and the like are processed within this circuit 32 into two separate stages at 66 and 68. Each of these stages 66 and 68 energize relays within the circuit 32 to provide a signal at 82, 84, 86, and 88 to interrupt a conductor or relay typically associated with the individual electrical loads (not shown). All such signals emanate at 82, 84, 86, and 88 simultaneously to shut down all electrical loads connected thereto simultaneously. Note that a total of four such electrical loads may be separately controlled.

Referring additionally back to FIG. 2, this control circuit 16 within its power calibration circuit 24 provides for the calibration of meter 40 by the adjustment of variable resistor 34 when switch 38 is closed. By this arrangement, the meter 40 may be calibrated to coincide with the power in kilowatts being received into the facility.

Separately, with switch 38 in the calibration (cal) position, variable resistors 36 allow for the preselection of the power input peak setting which, when exceeded, causes the shut down signal to be generated when the peak current level is exceeded for the preselected time period.

The first time period during which the input current into the facility must be exceeded as previously described is adjusted through variable resistor 42. Typically this time period is about four minutes. If the input current exceeds the peak current level as selected at 36 for the time period established through variable resistor 42, a shut down signal is generated within circuit 26 as previously described.

This equipment on/off decision circuit 26 also includes a variable resistor 44 used for determining the shut down time period, typically about twenty minutes. At the end of this time period, another digital pulsed signal is generated within circuit 26 which reactivates the down stream circuitry connection to each remote shut down module 32 to reestablish power to the individual load consuming loads connected to each remote shut down module 32.

To avoid an excessive power surge at the end of the second delay time period during which current has been shed, variable resistors 66 and 68 in FIG. 4 are individually set so as to result in a brief staggered or sequenced time period for reconnecting electrical power to the switches 82/84 and 86/88. This delay is typically in the range of one-half to one second between the settings of resistors 66 and 68 and is sufficient to avoid excessive power surge. Where additional remote shut down modules 32 are utilized for control of additional electrical equipment in the facility, the corresponding resistors 66 and 68 are properly adjusted accordingly so as to fully stagger and sequence the re-energizing of each of the electrical appliances and equipment connected thereto.

A fail safe feature of the invention is shown at 52 in FIG. 3. This circuit portion 52 is provided in the event of a complete power outage to the facility. When power is restored to the facility, this circuit portion 52 will be activated to reset each signal detector 62 of each remote shut down module 32. These signal detectors 62 are a purchased item, known as a receiving modules from X-10 Corporation and distributed by Litton Industries. The circuit portion 52 thus provides a 12-volt reset signal when power is restored to reset each signal detector 62 back to a start orientation. Otherwise, the signal detectors 62 would remain in their electrical position prior to the outage and would not function as the system 10 is designed.

A separate circuit portion in FIG. 3 is controlled by switch 90 for sending a continuous "equipment on" command through the downstream remainder of the system. This continuous "on" signal is useful when installing, adjusting or troubleshooting this system. The technician is thus able to check the signal at each remote shut down module 32 to insure proper functioning.

Figure 5:
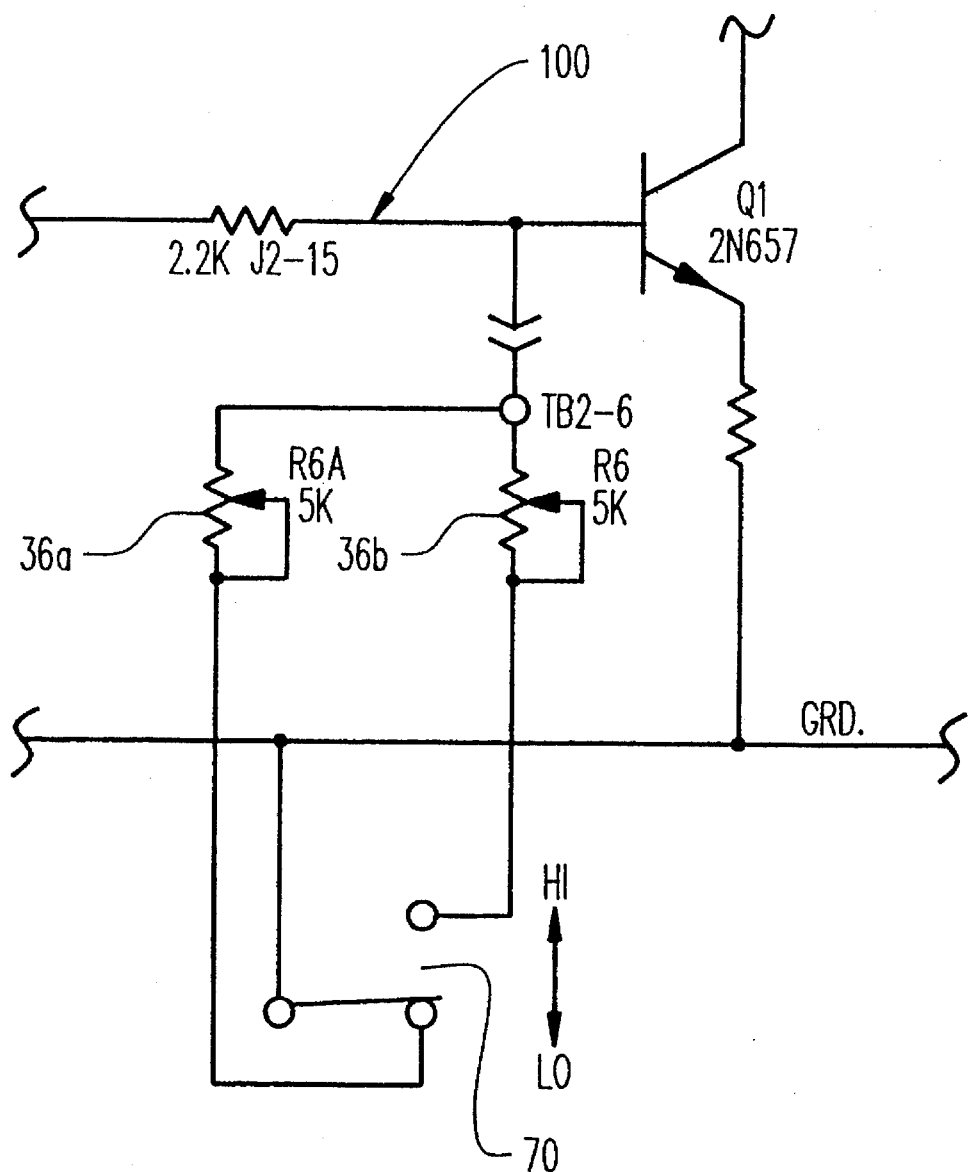
FIG. 5 is a detail schematic of an optional dual demand feature of the power detection and shut-down circuit of FIG. 2.

Referring lastly to FIG. 5, an alternate circuit is shown at 100 which replaces the corresponding circuit potion controlled by variable resistor 36 in FIG. 2. This circuit 100 provides a dual demand feature for facilities where there are primarily two separate demand requirements. A high demand is associated with a business in full operation, while a low demand is associated with only a potion of the operation. Examples of the need for this dual-function feature are with respect to churches on Sunday versus weekdays, and restaurants on weekends versus weekday business. The single variable resistor 36 is replaced by two separate adjustable or variables resistors 36a and 36b which allows the user to select manually or automatically by using a day/time-of-day timer both a high and a low peak demand level above which the system will emit a shutdown signal during different time periods as previously described.

It is envisioned that the present invention is particularly suited for facilities in the 25 to 300 kw power consumption level utilizing 3-phase electrical power service. However, the invention is equally well suited for single phase serviced facilities using lesser amounts of electrical power.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A system for monitoring incoming electric power being consumed in a facility and for interrupting the flow of electric power within the facility to selected power consuming loads when a preselected peak incoming power load is exceeded for a first preselected time period comprising:

first means for producing a power load signal proportional to the instantaneous total incoming amperage flowing into the facility;

a peak demand limiter including:

second means for receiving said power load signal and for providing a load shed control signal after said first preselected time period during which said power load signal has exceeded said preselected peak load;

third means for receiving said load shed control signal and for then sequentially transmitting independent first and second equipment shut-off signals each of short pulsed duration through a first and second phase power transmission line, respectively, of a multi-phase power line within the facility supplying electrical current to an electrical circuit breaker panel within the facility;

said third means also for repeating the sequential transmittal of said first and second shut-off signals through the first and second phase power transmission line;

a remote receiver connected between the circuit breaker panel and a first power consuming load including:

fourth means for receiving each said shut-off signal and for opening a first relay of the first power consuming load to interrupt electrical power being supplied from the circuit breaker panel to the first power consuming load;

fifth means for closing said first relay to restore electrical power to the first power consuming load after a second preselected time period.

2. A system as set forth in claim 1, wherein:

said second means is also for selectively providing an alternate load shed control signal occurring during a different preselected time of day than that of said first load shed control signal and after said first preselected time period during which said power load signal has continuously exceeded an alternate preselected peak load.

3. A system as set forth in claim 2, wherein:

said third means is also for producing a continuous test signal similar to said first and second equipment turn on signals being received by said remote receiver, said test signal for set-up and testing of said system.

4. A system as set forth in claim 1, wherein:

said third means sequentially transmits said first and second shut-off signals and includes means for repeating the sequential signal transmission.

5. A system as set forth in claim 4, wherein:

said third means is also for providing a reset signal to each said remote receiver immediately upon restoration of the incoming electrical power after a power outage.

6. A system for monitoring incoming electric power being consumed in a facility and for interrupting the flow of electric power within the facility to selected power consuming loads when a preselected peak incoming power load is exceeded for a first preselected time period comprising:

first means for producing a power load signal proportional to the instantaneous total incoming amperage flowing into the facility;

second means for receiving said power load signal and for providing a load shed control signal after said first preselected time period during which said power load signal has continuously exceeded said preselected peak load;

third means for receiving said load shed control signal and for then transmitting independent first and second equipment shut-off signals each of short pulsed duration through a first and second phase power transmission line, respectively, of a multi-phase power line within the facility supplying electrical current to an electrical circuit breaker panel within the facility;

said third means also for repeating the sequential transmittal of said first and second shut-off signals through the first and second phase power transmission line;

fourth means connected between the circuit breaker panel and a power consuming load for receiving each said shut-off signal and for opening a first relay of the first power consuming load to interrupt electrical power being supplied from the circuit breaker panel to the first power consuming load;

fifth means for closing said first relay to restore electrical power to the first power consuming load after a second preselected time period.

7. A system for monitoring incoming electric power being consumed in a facility and for interrupting the flow of electric power within the facility to selected power consuming loads when a preselected peak incoming power load is exceeded for a first preselected time period comprising:

first means for producing a power load signal proportional to the instantaneous total incoming amperage flowing into the facility;

a peak demand limiter including:

second means for receiving said power load signal and for providing a load shed control signal after said first preselected time period during which said power load signal has continuously exceeded said preselected peak load;

third means for receiving said load shed control signal and for then transmitting first and second equipment shut-off signals one immediately following the other and each of short pulsed duration through a power transmission line within the facility supplying electrical current to an electrical circuit breaker panel within the facility;

said third means also for repeating the sequential transmittal of said first and second shut-off signals through the first and second phase power transmission line;

a remote receiver connected between the circuit breaker panel and a first power consuming load including:

fourth means for receiving each said shut-off signal and for opening a first relay of the first power consuming load to interrupt electrical power being supplied from the circuit breaker panel to the first power consuming load;

fifth means for closing said first relay to restore electrical power to the first power consuming load after a second preselected time period.

\* \* \* \* \*